(12) United States Patent
Beaman et al.

(10) Patent No.: US 10,611,694 B2
(45) Date of Patent: Apr. 7, 2020

(54) SYSTEMS AND METHODS FOR ADDITIVE MANUFACTURING OF CERAMICS

(71) Applicant: BOARD OF REGENTS, THE UNIVERSITY OF TEXAS SYSTEM, Austin, TX (US)

(72) Inventors: Joseph Beaman, Austin, TX (US); Desiderio Kovar, Austin, TX (US); David Bourell, Sunset Valley, TX (US); Deborah Hagen, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 265 days.

(21) Appl. No.: 15/706,316

(22) Filed: Sep. 15, 2017

(65) Prior Publication Data

US 2018/0072630 A1    Mar. 15, 2018

Related U.S. Application Data

(60) Provisional application No. 62/395,117, filed on Sep. 15, 2016.

(51) Int. Cl.
*C04B 35/64* (2006.01)
*B33Y 10/00* (2015.01)
(Continued)

(52) U.S. Cl.
CPC .............. *C04B 35/64* (2013.01); *B33Y 10/00* (2014.12); *B33Y 30/00* (2014.12); *C04B 35/622* (2013.01);
(Continued)

(58) Field of Classification Search
CPC ....... C04B 35/64; C04B 35/622; C04B 35/653; C04B 2235/6026; C04B 2235/608;
(Continued)

(56) References Cited

U.S. PATENT DOCUMENTS

| 3,294,530 A | 12/1966 | Storchheim |
| 8,940,220 B2 | 1/2015 | Raj et al. |

(Continued)

FOREIGN PATENT DOCUMENTS

WO    2015200280 A1    12/2015

OTHER PUBLICATIONS

Chaim, "Electric Field Effects During Spark Plasma Sintering of Ceramic Nanoparticles," Journal of Materials Science 48, (2013), 502-510.

(Continued)

*Primary Examiner* — Alison L Hindenlang
*Assistant Examiner* — Andrés E. Behrens, Jr.
(74) *Attorney, Agent, or Firm* — Meunier Carlin & Curfman LLC

(57) ABSTRACT

Various implementations include systems and methods for simultaneously applying an electric field and localized energy from an energy source to ceramic particles on a layer by layer basis to form a ceramic workpiece using additive manufacturing. The workpiece may be freely removed from the unsintered ceramic particles. In some implementations, the workpiece is partially densified when removed from the unsintered ceramic particles, but it may be heated until fully densified. According to some implementations, these systems and methods remove or reduce the need for binders and reduce manufacturing time.

22 Claims, 9 Drawing Sheets

(51) Int. Cl.
B33Y 30/00 (2015.01)
C04B 35/622 (2006.01)
C04B 35/653 (2006.01)

(52) U.S. Cl.
CPC ...... *C04B 35/653* (2013.01); *C04B 2235/608* (2013.01); *C04B 2235/6026* (2013.01); *C04B 2235/661* (2013.01); *C04B 2235/665* (2013.01); *C04B 2235/666* (2013.01)

(58) Field of Classification Search
CPC ........ C04B 2235/661; C04B 2235/665; C04B 2235/666; B33Y 10/00; B33Y 30/00
See application file for complete search history.

(56) References Cited

U.S. PATENT DOCUMENTS

| | | | |
|---|---|---|---|
| 9,431,041 | B1 | 8/2016 | Ee et al. |
| 2009/0189315 | A1 | 7/2009 | Günster et al. |
| 2013/0079693 | A1 | 3/2013 | Ranky et al. |
| 2014/0014639 | A1 | 1/2014 | Couret et al. |
| 2014/0306381 | A1 | 10/2014 | Raj et al. |
| 2015/0329430 | A1 | 11/2015 | Sun et al. |
| 2016/0348247 | A1* | 12/2016 | Hunt .................... C23C 24/082 |
| 2017/0009329 | A1* | 1/2017 | Hunt .................... C23C 24/103 |

OTHER PUBLICATIONS

Cologna, et al., "Field Assisted and Flash Sintering of Alumina and Its Relationship to Conductivity and MgO-Doping," Journal of the European Ceramic Society 31, (2011), 2827-2837.

Cologna, et al., "Flash Sintering of Nanograin Zirconia in <5 s at 850 C", J. Am. Ceram. Soc., 93(11), (2010), 3556-3559.

Cologna, et al., "Flash-Sintering of Cubic Yttria-Stabilized Zirconia at 750 C for Possible Use in SOFC Manufacturing," Journal of the American Ceramic Society 94(2), (2011), 316-319.

Francis, et al., "Particle size effects in flash sintering," Journal of the European Ceramic Society 32, (2012), 3129-3136.

Gaur, et al., "Densification of La0.6Sr0.4Co0.2Fe0.8O3 ceramic by flash sintering at temperature less than 100 C", J Mater Sci 49, (2014), 6321-6332.

Gaur, et al., "Flash-sintering of MnCo2O4 and its relation to phase stability," Journal of the European Ceramic Society 34, (2014), 2391-2400.

Hao, et al., "A Novel Sintering Method to Obtain Fully Dense Gadolinia Doped Ceria by Applying a Direct Current," Journal of Power Sources 210, (2012) 86-91.

Liu, et al., "Microstructure study on selective laser melting yttria stabilized zirconia ceramic with near IR fiber laser", Rapid Prototyping Journal, 20(5), (1995), 346-354.

Muccillo, et al., "Electric field-assisted flash sintering of tin dioxide," Journal of the European Ceramic Society 34, (2014), 915-923.

Raj, et al., "Influence of Externally Imposed and Internally Generated Electrical Fields on Grain Growth, Diffusional Creep, Sintering and Related Phenomena in Ceramics," J. Am. Ceram. Soc., 94(7), (2011), 1941-1965.

Yoshida, et al., "Densification Behaviour and Microstructural Development in Undoped Yttria Prepared by Flash-Sintering," Journal of the European Ceramic Society 34, (2014), 991-1000.

Zapata-Solvas, et al., "Preliminary Investigation of Flash Sintering of SiC," Journal of the European Ceramic Society 33(13-14), (2013), 2811-16.

Zocca, et al., "Additive Manufacturing of Ceramics: Issues, Potentialities, and Opportunities," Journal of the American Ceramic Society 98(7), (2015), 1983-2001.

International Search Report and Written Opinion issued in International Application No. PCT/US2017/051871, dated Feb. 1, 2018.

\* cited by examiner

SYSTEMS AND METHODS FOR ADDITIVE MANUFACTURING OF CERAMICS

CROSS REFERENCE TO RELATED APPLICATIONS

This application claims priority to U.S. Patent Application No. 62/395,117, entitled "Systems and Methods for Additive Manufacturing of Ceramics," filed Sep. 15, 2016, the content of which is herein incorporated by reference in its entirety.

BACKGROUND

Additive manufacturing processes such as selective laser sintering have enabled rapid prototyping and production of objects with complex shapes in a wide variety of materials. Direct sintering of technical ceramics using additive manufacturing processes is much more difficult than processing of polymers and metals. Ceramics generally sinter at higher temperatures, and sintering rates of technical ceramics are usually limited by relatively slow solid state diffusion-based kinetics. Direct sintering in additive manufacturing requires rapid kinetics. In addition, ceramics are typically brittle and fracture easily due to thermally or mechanically induced stress and strain. Because of these issues, additive manufacturing processes involving technical ceramics currently rely on the indirect process of fusing ceramic particles together with polymers or other binders. The parts require extensive post-processing, which includes moisture removal and binder or polymer burn out, followed by a traditional furnace sintering. Binder burn out for large or thick parts is particularly challenging and time consuming.

Additive manufacturing by selective laser sintering or selective laser melting of ceramics is also limited by cracking due to thermal and shrinkage stresses in the manufacturing process.

Accordingly, there is a need in the art for improved systems and methods for manufacturing ceramic parts using additive manufacturing.

BRIEF SUMMARY

According to various implementations, a method of producing a workpiece using additive manufacturing includes: (1) providing a first electrode and a second electrode, the electrodes being spaced apart and opposite each other; (2) depositing a layer of ceramic particles; (3) applying a voltage across the electrodes, the voltage causing the electrodes to create an electric field between them, where at least a first portion and a second portion of the layer of ceramic particles are disposed within the electric field; (4) applying localized energy to the first portion of the layer of ceramic particles using an energy source, the first portion of the layer of ceramic particles being sintered to form part of the workpiece, and the second portion of the layer of ceramic particles to remain unsintered; (5) repeating the deposition of ceramic particles and application of the electric field and the localized energy until the workpiece is formed; and (6) removing the formed workpiece from the unsintered ceramic particles, wherein applying the localized energy occurs while the electric field is applied.

In some implementations, adjacent ceramic particles neck together in response to application of the electric field and the localized energy, causing initial stage sintering.

In some implementations, the formed workpiece is heated. For example, in some implementations, the formed workpiece is heated until fully densified.

In some implementations, the method further includes depositing an electrically conductive material between the first portion of the layer of ceramic particles to be sintered and the first electrode, wherein the electrically conductive material is electrically coupled to the first electrode. For example, in some implementations, the electrically conductive material is a first set of electrically conductive material, and the method further comprising depositing a second set of the electrically conductive material between the first portion of the layer of ceramic particles to be sintered and the second electrode, wherein the second set of electrically conductive material is electrically coupled to the second electrode. In a further implementation, the method includes depositing a third set of the electrically conductive material to at least a portion of the first portion of the layer of ceramic particles.

In some implementations, the method further includes depositing an electrically conductive material to at least a portion of the first portion of the layer of ceramic particles to which the localized energy is applied for forming the workpiece.

In some implementations, the layer of ceramic particles is free of organic binder materials.

In some implementations, the electrically conductive material comprises a ceramic powder doped with aliovalent substitution.

In some implementations, the electrically conductive material comprises colloidal carbon ink.

In some implementations, the energy source comprises a laser beam.

In some implementations, the energy source comprises a lamp and a mask, the mask defining the shape of a perimeter of the first portion of the layer of ceramic particles, the mask being disposed between the lamp and the layer of ceramic particles. For example, in some implementations, the mask is a physical mask, and in other implementations, the mask is a virtual mask. In one exemplary implementation, the virtual mask is provided by a digital light patterning (DLP) projector.

In some implementations, depositing the layer of ceramic particles comprises depositing a slurry comprising the ceramic particles. And, in some implementations, depositing the slurry comprises tape casting the slurry.

In some implementations, the method further comprises at least partially removing non-ceramic slurry components prior to applying the electric field and localized energy. For example, in some implementations, at least partially removing non-ceramic slurry components comprises evaporation and/or pyrolysis of at least a portion of the non-ceramic slurry components.

In some implementations, heating the workpiece comprises heating the workpiece in a furnace, and the formed workpiece is partially densified prior to heating in the furnace and is fully densified after heating in the furnace.

In some implementations, providing the first and second electrodes comprises providing first and second pre-fabricated conductive plates.

In some implementations, providing the first and second electrodes comprises depositing a first set of electrically conductive material adjacent the build material and a second set of electrically conductive material adjacent the build material.

In some implementations, the method further comprises heating the workpiece and unsintered ceramic particles in a furnace prior to removing the formed workpiece from the unsintered ceramic particles.

In some implementations, the method further comprises moving the electrodes up or down relative to the build platform and/or inward or outward relative to a centerline of the layer of ceramic particles disposed within the electric field.

According to various implementations, a system for producing a workpiece using additive manufacturing includes a build platform; a ceramic particle distributor for distributing ceramic particles in a layer on the build platform; a first electrode and a second electrode disposed adjacent the build platform, the first and second electrodes being spaced apart and opposite each other and are electrically coupled to a voltage source for applying a voltage across the electrodes, wherein the electrodes create an electric field between and adjacent to the electrodes in response to receiving the voltage; and an energy source disposed adjacent to the first and second electrodes to deliver localized thermal energy to the ceramic particles to be sintered into a workpiece, wherein the ceramic particle distributor deposits a layer of ceramic particles within the electric field over the build platform, and localized heat is delivered by the energy source to a first portion of the layer of ceramic particles disposed within the electric field simultaneously with the application of the electric field by the electrodes, the first portion of the layer of ceramic particles being at least partially sintered into the workpiece, and a second portion of the layer of ceramic particles being unsintered.

In some implementations, the system further includes a furnace, wherein the at least partially sintered workpiece is heated in the furnace after being removed from the unsintered ceramic particles.

In some implementations, the system further includes an electrically conductive material dispenser, the electrically conductive material dispenser distributing electrically conductive material onto the layer of ceramic particles between the first portion of the layer of ceramic particles to be sintered and the first electrode and/or second electrode.

In some implementations, the ceramic particle distributor comprises a doctor blade.

In some implementations, the energy source comprises a laser beam.

In some implementations, the energy source comprises a lamp and a mask, the mask defining the shape of a perimeter of the first portion of the layer of ceramic particles, the mask being disposed between the lamp and the layer of ceramic particles. For example, in some implementations, the mask is a physical mask. And, in other implementations, the mask is a virtual mask. For example, in certain implementations, the virtual mask is provided by a digital light patterning (DLP) projector.

In some implementations, the furnace is a first furnace, and the system further includes a second furnace, the build platform being disposable with the second furnace to heat the layers of ceramic particles prior to removal of the workpiece from the unsintered particles.

In some implementations, the system further includes at least one motor coupled to the first and/or second electrodes, the motor configured for moving the first and/or second electrodes up or down relative to the build platform and/or inward or outward relative to a centerline of the build platform.

DETAILED DESCRIPTION

Various implementations include systems and methods for simultaneously applying an electric field and localized energy from an energy source to ceramic particles on a layer by layer basis to form a ceramic workpiece using additive manufacturing. The workpiece may be freely removed from the unsintered ceramic particles. In some implementations, the workpiece is partially densified when removed from the unsintered ceramic particles, but it may be subsequently heated until fully densified via a post processing heat treatment. According to some implementations, these systems and methods remove or reduce the need for binders and reduce manufacturing time. Some implementations also greatly ameliorate the risk of fracture via thermal shock when the localized heating is performed.

Various ceramic materials, including yttria-stabilized zirconia (YSZ) and alumina have been shown to conduct electricity and sinter in a furnace within a period of seconds from a pressed, un-sintered, ceramic part to a densified part upon simultaneous exposure to an electric field and high temperatures. During this flash sintering process, current rapidly rises, and sintering and densification occurs within a few seconds of the current rise through the ceramic. The typical sintering time for ceramics of these types is at least one hour at temperatures of at least 1000° C., depending on the material, if the electric field is not applied during heating.

Figure 1:
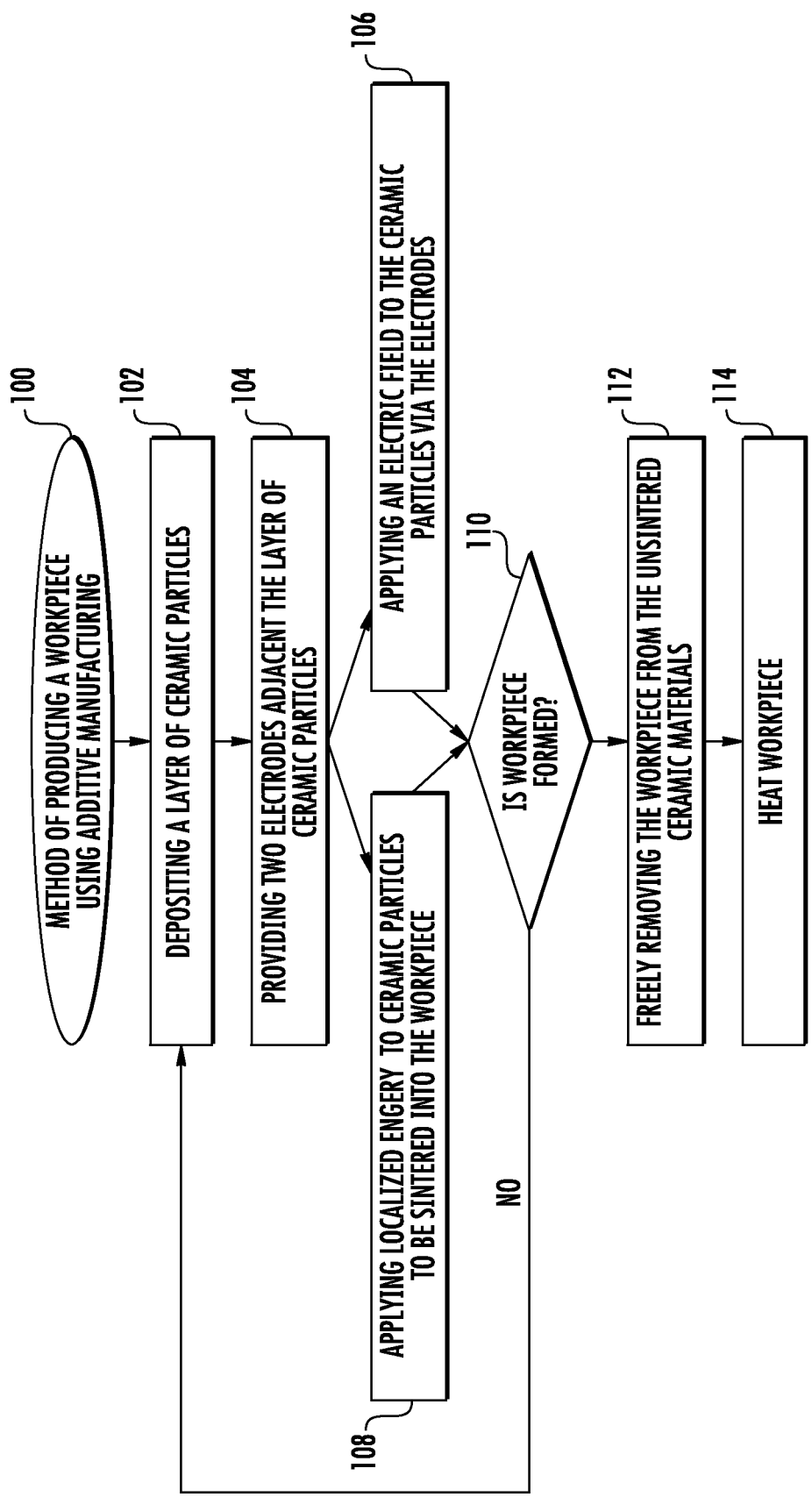
FIG. 1 illustrates a flow chart of a method of producing a ceramic workpiece using additive manufacturing according to one implementation.

FIG. 1 illustrates a method 100 of producing a ceramic workpiece using additive manufacturing according to various implementations. Beginning at step 101, first and second electrodes are provided. For example, the electrodes may include pre-fabricated electrically conductive plates that are disposed adjacent the build platform, according to some implementations. The electrodes are spaced apart from each other to create a gap between them. A voltage applied across the electrodes causes the electrodes to create an electric field (e.g., AC or DC electric field) between and around the electrodes. In addition, the ratio of the voltage to the width of the gap between the electrodes is selected based on the material to be sintered. For example, at least 100V/cm may be useful for sintering zirconia, at least 10V/cm may be useful for sintering $La_{0.6}Sr_{0.4}Co_{0.2}Fe_{0.8}O_3$, and at least 500V/cm may be useful for sintering alumina.

In step 102, a layer of ceramic particles is deposited within the electric field created and between planes through which surfaces of the electrodes extend. The layer of ceramic particles are deposited on a build platform or on a previously deposited layer of ceramic particles, which may be referred to herein as build material. The ceramic particles may include single or multiple constituents (e.g., composites) and can be amorphous (e.g., glass) or crystalline. For example, in some implementations, the ceramic particles include aluminum oxide. In particular implementations, the ceramic particles may be doped with magnesium oxide (e.g., 0.25% magnesium oxide within the aluminum oxide). The magnesium oxide facilitates sintering of the aluminum oxide, according to some implementations. Other suitable doped ceramic particles may include carbides (e.g., SiC or $B_4C$), nitrides (e.g., $Si_3N4$, BN, and AlN), borides (e.g., $ZrB_2$ and $HfB_2$), metal oxides, such as zirconia-based ceramics (e.g., yttria-stabilized zirconia, yttria-stabilized or partially stabilized zirconia, calcia-stabilized zirconia, and magnesia stabilized zirconia), and other oxides (e.g., porcelains, $HfO_2$, $SiO_2$, as well as complex oxides such as perovskites and layered oxide compounds).

The ceramic particles may be deposited in a powder form onto the build platform or build material by a ceramic particle distributor. The ceramic particle distributor may include a ceramic powder bed feed bed, a powder feed, and a powder spreader, according to some implementations. For each layer of the powder bed, the powder feed bed is displaced upwardly, the build platform is displaced downwardly, and the powder spreader pushes an upper layer of powder over to the build platform or the uppermost layer of powder deposited thereon. The amount of movement up and down depends on the thickness of the powder bed layer being moved by the powder spreader.

In addition, in some implementations, at least some compaction may be required for the powder prior to sintering the powder. For example, a force may be may be applied perpendicular to the plane of the powder bed using a separate plate or roller. Typically, powder packing densities are less than or equal to 40% unless they are packed at elevated pressures using pressure produced by mechanical compaction or a gas pressure.

In other implementations, the ceramic particles may be mixed with a liquid to form a slurry. In implementations in which the ceramic slurry is deposited on the build platform or build material, the ceramic particle distributor may include a doctor blade or a slot die, for example. Slurries allow for higher powder packing densities, such as between 50% and 70%.

Although step 102 is shown after step 101 in FIG. 1, these steps may occur simultaneously or in reverse order.

In the implementation described above, the electrodes are pre-fabricated. However, in other implementations, the electrodes may be formed by depositing layers of an electrically conductive material such as a metal, ink, or conducting ceramic on opposite and spaced apart sides of the ceramic particle powder bed. Or, the electrically conductive material may be applied to portions of the powder bed that are opposite and spaced apart from each other to form the electrodes.

Figure 10A:
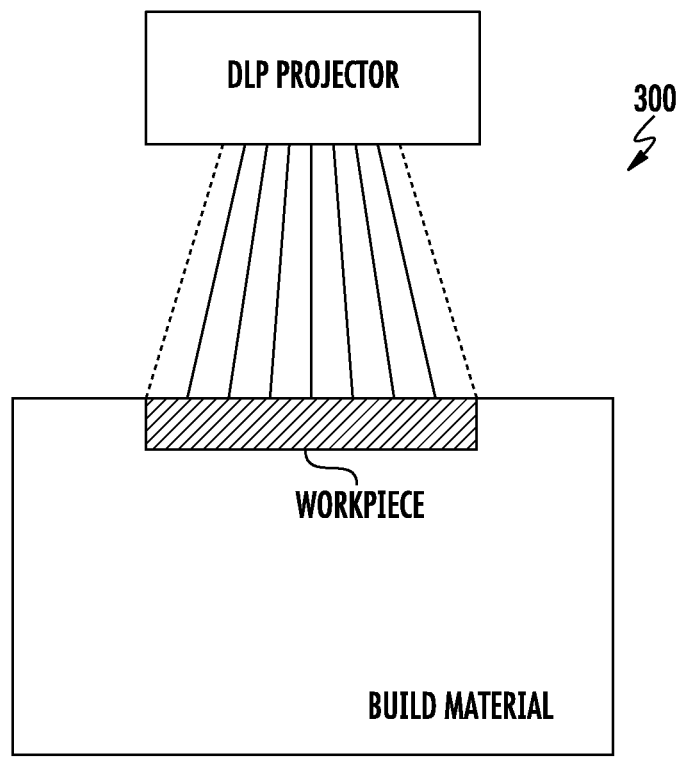
FIGS. 10A and 10B illustrate a partial side view and partial top view, respectively, of a system for additive manufacturing according to another implementation.
Figure 10B:
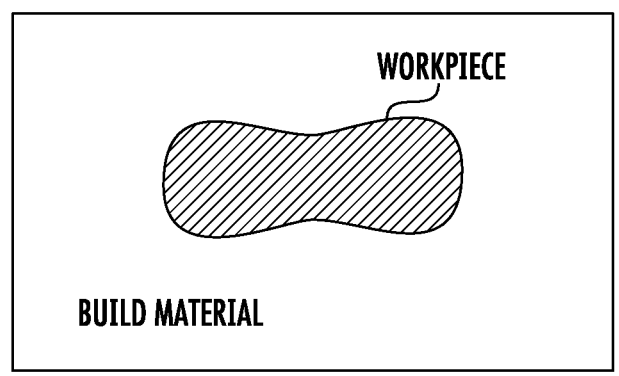
Figure 11A:
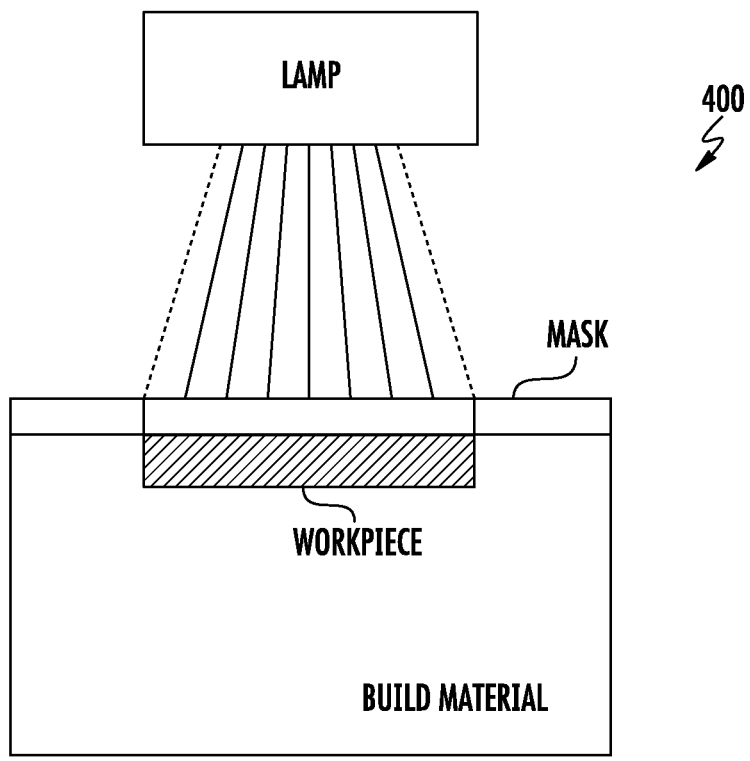
FIGS. 11A and 11B illustrate a partial side view and partial top view, respectively, of a system for additive manufacturing according to another implementation.
Figure 11B:
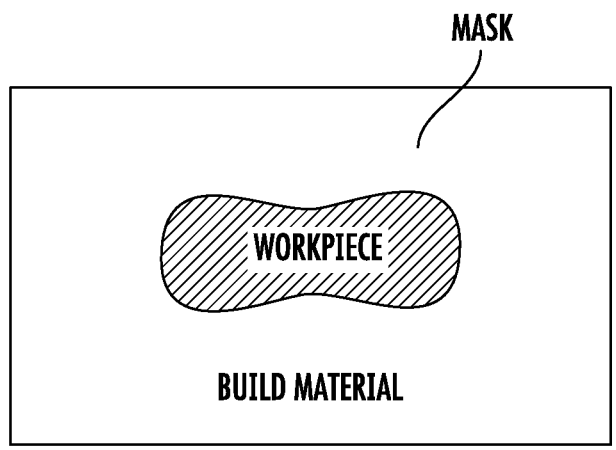

According to some implementations, the electrically conductive material may include metal or colloidal carbon ink. The electrically conductive material may be deposited using an electrically conductive material dispenser disposed above the build platform. In some implementations, the electrically conductive material may be melted and solidified with a projected energy source (e.g., digital light patterning (DLP) projector or other projector-based system, such as a light emitting diode (LED) or a lamp/mask) or other heat source to improve its conductivity. For example, FIGS. 10A and 10B illustrate a system 300 that includes a DLP projector as the localized energy source, and FIGS. 11A and 11B illustrate a system 400 that includes a lamp and mask. FIGS. 10A and 10B and 11A and 11B are partial views in that the electrodes of each system 300, 400 are not shown.

The distance between the electrodes may be consistent across the gap between the electrodes, or the distance may be varied (reduced or expanded) adjacent one or more areas of the workpiece. To control the distance between the electrodes or between one or both electrodes and at least a portion of the workpiece, a first set of electrically conductive material may be deposited on or adjacent the ceramic particles to be sintered and the first electrode and/or a second set of electrically conductive material may be deposited on or adjacent the ceramic particles to be sintered and the second electrode. The first set of electrically conductive material is electrically coupled to the first electrode, and the second set of electrically conductive material is electrically coupled to the second electrode.

Next, in step 106, a voltage is applied across the electrodes to create the electric field between and adjacent to the electrodes. For example, the electric field may be from 10V/cm to over 1000V/cm, depending on the material. In some implementations, neck formation may begin before a measurable current is detectable.

In step 108, an energy source applies localized energy to a portion of the layer of ceramic particles to be sintered into the workpiece. The particles are disposed within the electric field. The localized energy is applied while the electric field is applied to sinter the portion of the layer of ceramic particles receiving the localized energy. In some implementations, the energy source is a scanning energy source, such as a laser or an electron beam or other suitable source for delivering localized heat to a small set of particles at a time (e.g., those within the diameter of the beam). The beam moves relative to the particles to sinter the particles into a two-dimensional shape corresponding to the layer of the workpiece being sintered. In other implementations, the energy source providing the localized energy may include a projected energy source that selectively projects energy onto a larger set or all of the particles to be sintered in the layer at one time. For example, in some implementations, the projected energy source may include a lamp or light emitting diode (LED). And, in some implementations, the projected energy source includes a virtual mask (e.g., digitally created mask pattern) that allows energy that corresponds to the two-dimensional pattern to be sintered to be projected onto the layer of particles (e.g., a digital light patterning (DLP)

projector). In other implementations, the projected energy source is projected through a physical mask that is disposed between the energy source and the particles. The physical mask defines at least one opening that corresponds to the two-dimensional pattern to be sintered in the layer and blocks the projected energy source from those particles that are not intended to be sintered.

In some implementations, the power of the energy source and the scan speed for scanning energy sources (e.g., laser or electron beams) or time of exposure to the energy source for non-scanning energy sources (e.g., projected energy sources) may be selected based on the relative density desired and the material being sintered.

According to some implementations, the temperature applied by the energy source is sufficient to initiate initial stage sintering in combination with the electric field. The energy from the laser, for example, has a wavelength that is absorbable by the material being sintered. For example, a $CO_2$ laser may be used for sintering alumina.

In addition, one or more parameters of the electric field and/or the localized energy may be altered during sintering based on feedback from the sintering process. For example, bore-sight sensors may be used to obtain spectroscopy data immediately adjacent to the beam path.

In addition, in some implementations, electrically conductive material may also be deposited to a least a portion of the ceramic particles to which the localized energy is to be applied for forming the workpiece. In addition, aliovalent substitution may be selected to increase vacancies, which could further increase electrical conductivity and enhance sintering.

Deposition of a layer of ceramic particles and application of the localized energy and electric field between and adjacent to the electrodes are repeated until the workpiece is formed, as shown in step 110. For implementations in which the electrodes provided are not pre-fabricated electrically conductive plates but are formed from depositing or patterning electrically conductive material, the step of depositing a layer of the electrically conductive material with each layer of ceramic particles is also repeated until the workpiece is formed. Thus, the upper layer of ceramic particles to which the localized energy is applied are within the electric field applied by the electrodes.

The formed workpiece is then freely removed from the unsintered ceramic particles, as shown in step 112. The unsintered ceramic particles may fall away from the formed workpiece or may be removed from the surface of the formed workpiece using a pressurized or non-pressurized fluid, such as air, ethanol, or water.

Figure 6A:
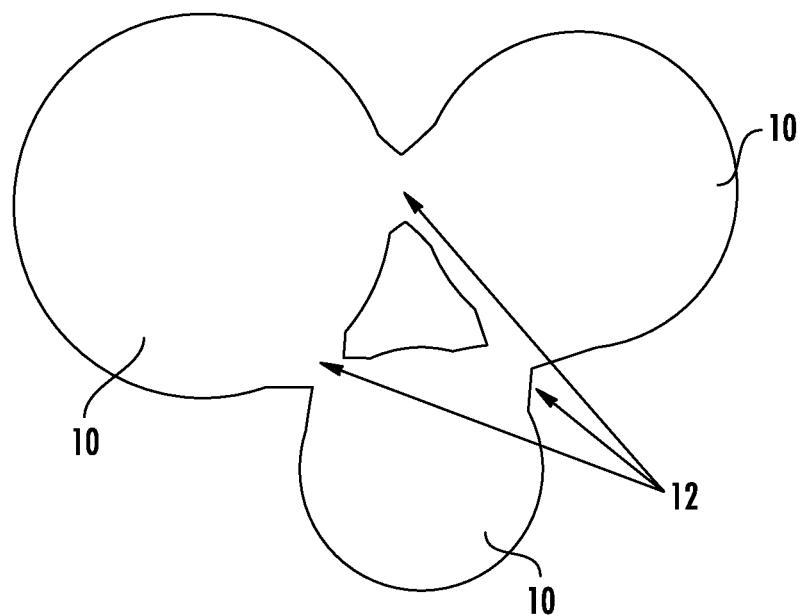
FIG. 6A illustrates necking between ceramic particles during the additive manufacturing process, according to one implementation.

In some implementations, the workpiece is partially densified. For example, the formed workpiece may have a relative density of 30-85% (e.g., 30%-70% or 65%-85%) when removed in step 112. In particular, during steps 106 and 108, adjacent ceramic particles neck together in response to the application of the electric field and the localized energy, causing initial stage sintering of the particles. FIG. 6A illustrates exemplary necking 12 of particles 10 in the formed workpiece according to one implementation.

In certain implementations, the neck growth between particles is strong enough to allow the workpiece to be removed from the powder bed and handled, and a subsequent, post-build high temperature sintering treatment can then be conducted to fully or further densify the workpiece, if desired. If further or full densification of the workpiece is desired, the formed workpiece is heated, as shown in step 114. The formed workpiece may be heated in a furnace, for example, at a certain temperature for a certain time period, depending on the material. For example, for alumina or magnesium oxide doped alumina, typical heating temperatures may be 1200° C. to 1600° C. for one to ten hours, depending on the particle size of the starting powder. Sintering temperatures for yttria-doped zirconia may be 150° C. lower than for alumina.

In implementations in which the neck growth between particles may not be sufficient after exposure to the localized energy and the electric field, the build platform may be heated in a furnace (e.g., the same furnace or a separate furnace that is used for the post-build sintering) prior to being removed from the unsintered particles.

According to various implementation, the method 100 allows ceramic particles to be sintered together in an additive manufacturing process substantially without organic binder materials in the layer of ceramic particles.

Figure 2:
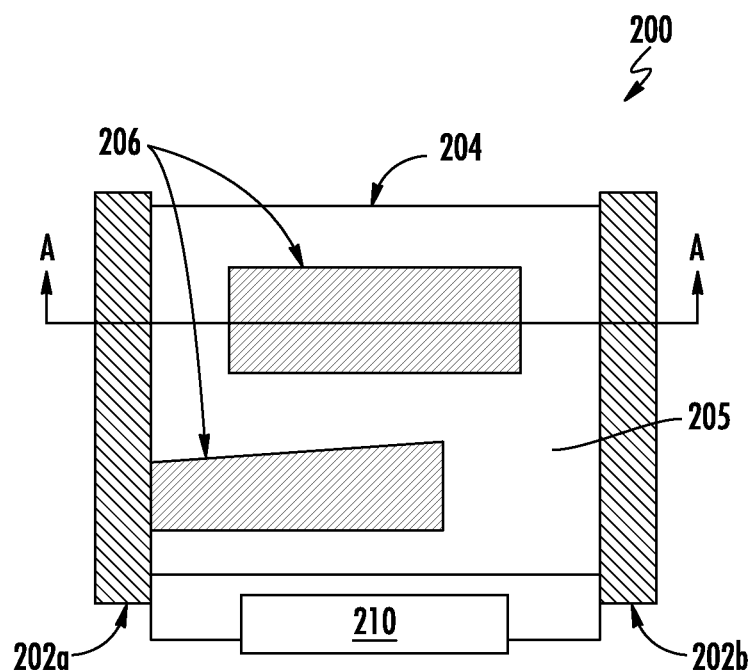
FIG. 2 illustrates a top view of an exemplary workpiece and system for additive manufacturing the same according to one implementation.
Figure 3:
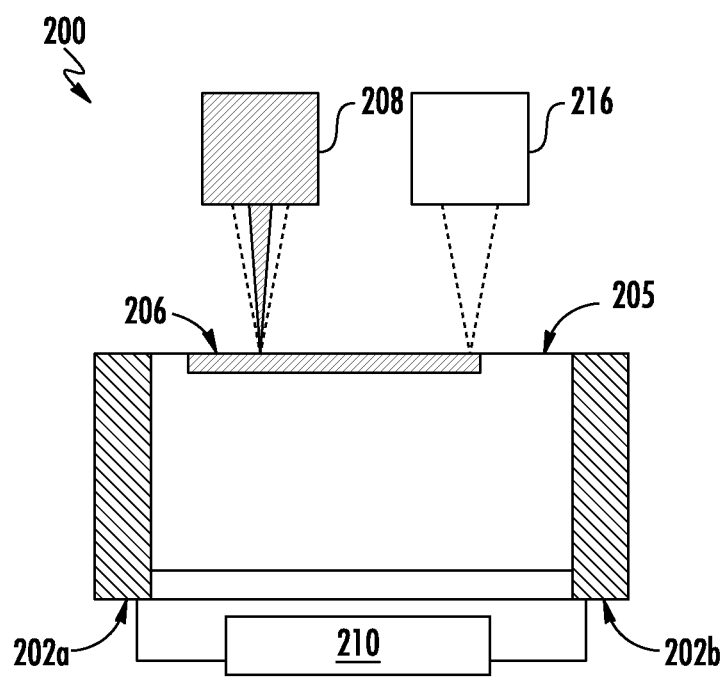
FIG. 3 illustrates a cross sectional view of the workpiece and system shown in FIG. 2 as viewed through the A-A line of FIG. 2.

FIGS. 2 and 3 illustrate an exemplary system 200 for producing a workpiece using additive manufacturing according to one implementation using the method described above in relation to FIG. 1. The system 200 includes electrodes 202a, 202b disposed adjacent build platform 204. The electrodes 202a, 202b are spaced apart and opposite each other and are electrically coupled to a voltage source 210. As noted above, the voltage source 210 applies a voltage across the electrodes 202a, 202b, which creates an electric field in the space between and adjacent to the electrodes 202a, 202b.

Workpiece 206 is at least partially densified by applying localized energy to the ceramic particles to be sintered using a laser beam 208 while the electric field is applied to the ceramic particles by the electrodes 202a, 202b. Following the partial densification, the workpiece 206 is removed from the unsintered particles. To fully densify the workpiece 206, the workpiece 206 is then sintered in a furnace.

Figure 4:
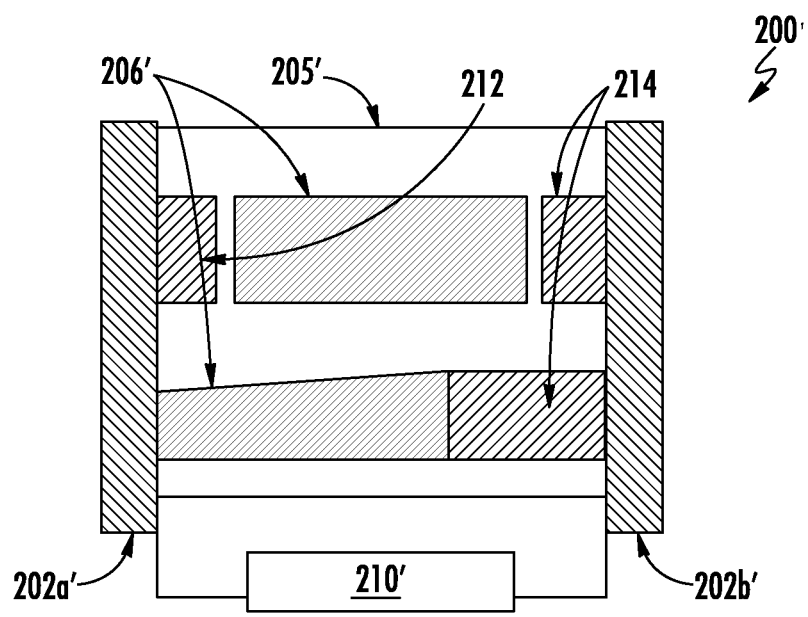
FIG. 4 illustrates a top view of an exemplary workpiece and system for additive manufacturing the same according to one implementation.
Figure 5:
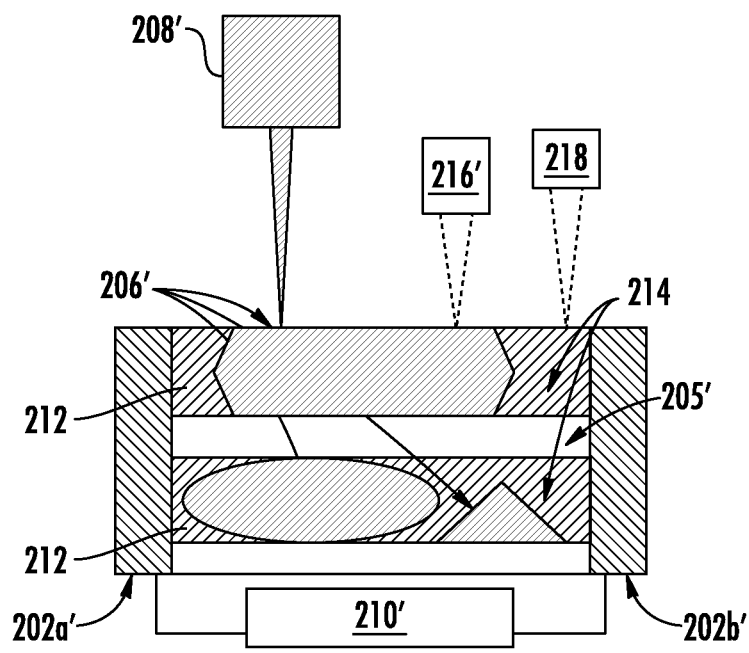
FIG. 5 illustrates a cross sectional view of the workpiece and system shown in FIG. 4 as viewed through the B-B line of FIG. 4.
Figure 12A:
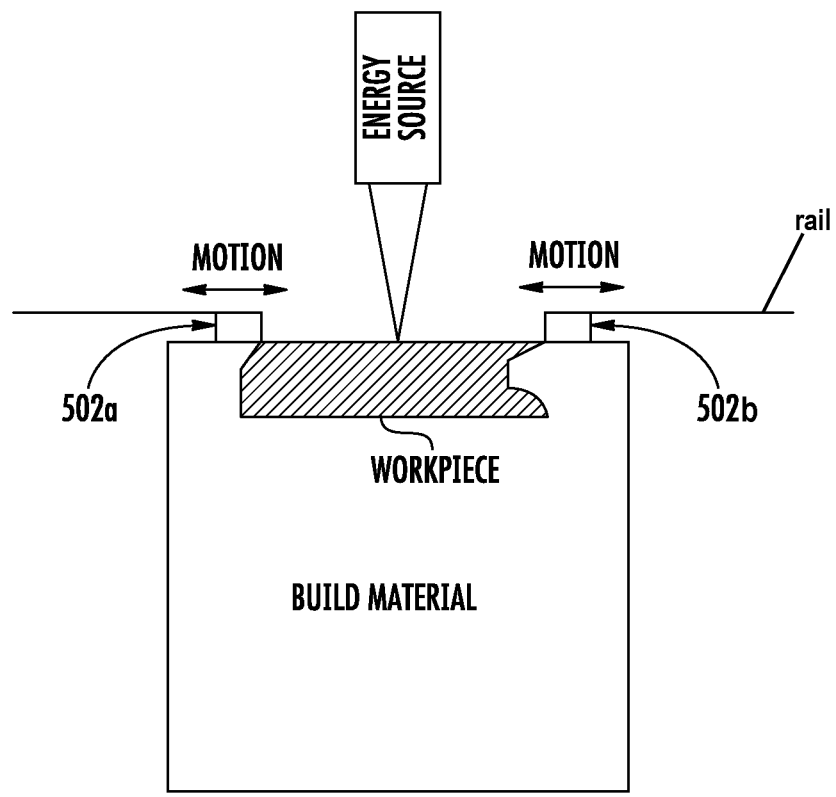
FIGS. 12A and 12B illustrate a side view and top view, respectively, of a system for additive manufacturing according to another implementation.
Figure 12B:
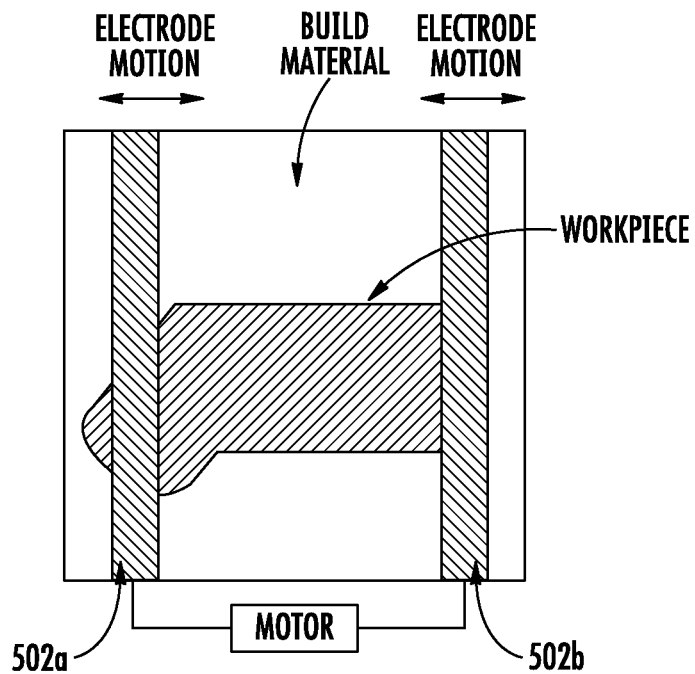

The implementation shown in FIGS. 4 and 5 is similar to that shown in FIGS. 2 and 3. However, in the system 200' shown in FIGS. 4 and 5, a first set of electrically conductive material 212 is deposited between the ceramic particles to be sintered and the first electrode 202a', and a second set of electrically conductive material 214 is deposited between the ceramic particles to be sintered and the second electrode 202b'. The first set of electrically conductive material 212 is electrically coupled to the first electrode 202a', and the second set of electrically conductive material 214 is electrically coupled to the second electrode 202b'. The first set of electrically conductive material 212 and the second set of electrically conductive material 214 are printed (or patterned) onto the build material 205' on the build platform 204' in FIGS. 4 and 5 using an electrically conductive material distributor 218, which is disposed above the build platform 204'. However, in other implementations, the electrically conductive material extending between the electrodes and portions of ceramic particles to be sintered may be pre-fabricated. Adjusting the distance between the electrodes can adjust the strength of the electric field created between and adjacent to the electrodes. In addition, in other implementations, such as shown in FIG. 12B, a set of electrically conductive material may be deposited between two workpieces or two portions of a single workpiece that are spaced apart from each other on the build platform.

Figure 8:
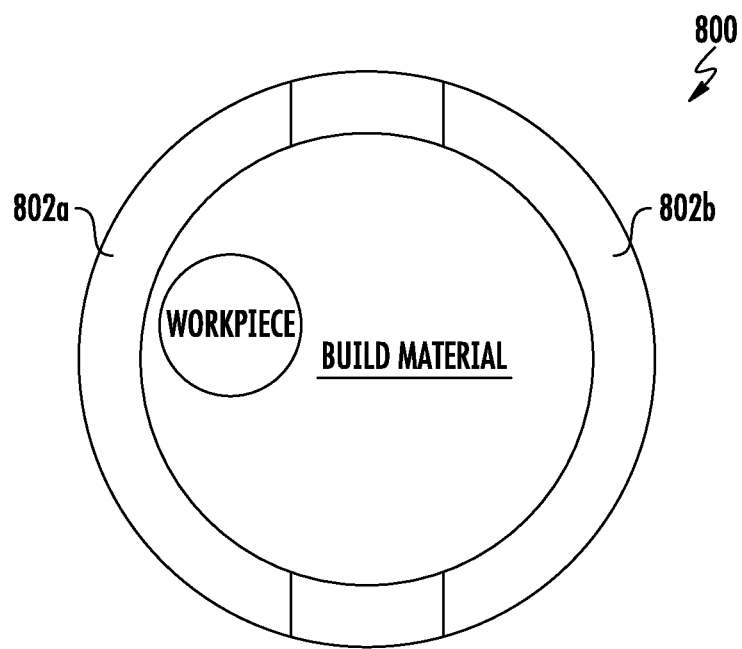
FIG. 8 illustrates a top view of electrodes and build material according to another implementation.
Figure 9:
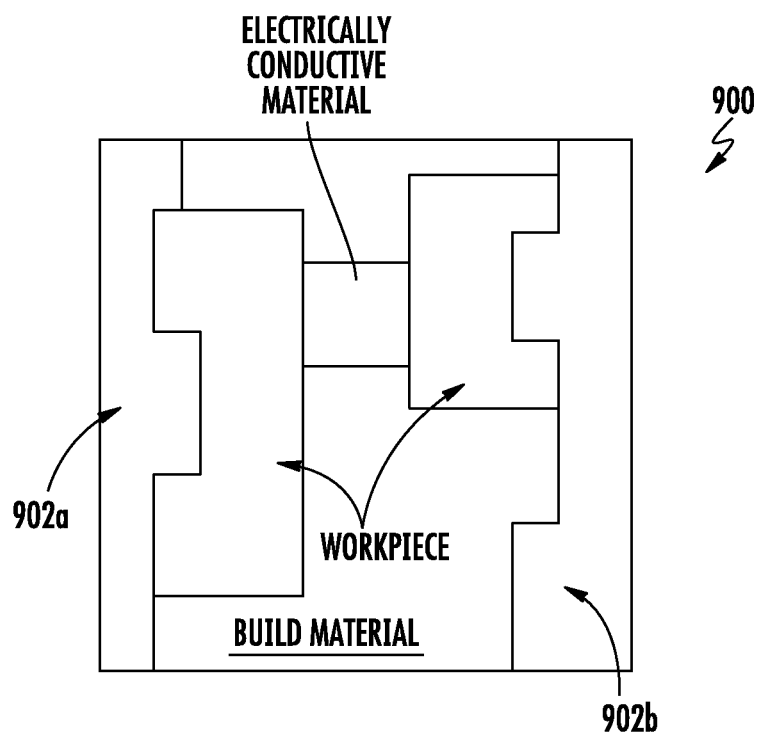
FIG. 9 illustrates a top view of electrodes and build material according to another implementation.

In addition, the shape of the faces of the electrodes 202a, 202b shown in FIGS. 2-3 and 202a', 202b' shown in FIGS. 4-5 are generally planar and parallel to each other. However, in other implementations, the faces of the electrodes may be non-planar and/or non-parallel to each other. For example, as shown in FIG. 8, the faces of the electrodes 802a, 802b are arcuate shaped as viewed from a top view of the system 800. And, in FIG. 9, the faces of the electrodes 902a, 902b have a stepped profile as viewed from a top view of the system 900. In addition, the electrodes shown in FIGS. 2-5 and 8-9 extend the depth of the powder bed, but in other implementations, the electrodes can extend to a depth that is greater than the depth of the powder bed or less than the depth of the powder bed. For example, as shown in FIGS. 12A and 12B, the electrodes 502a, 502b may be a single layer thick so that they are adjacent to the top layer of the powder bed.

Furthermore, in some implementations, one or more electrodes may be movable relative to the powder bed. For example, one or more electrodes may be slidable relative to the centerline of the powder bed and/or along the edges of the powder bed, which may minimize the need for electrodes to be printed alongside the workpiece. In the implementation shown in FIGS. 12A and 12B, the electrodes are on the surface of the part bed, touching the top layer of ceramic particles, and the electric field between and adjacent the electrodes extends through the top layer of ceramic particles between planes through which surfaces of the electrodes extend. As shown, each electrode is coupled to a motor, and the motor causes the electrode to move (e.g., via rails) into the intended position for the particular layer in response to receiving instructions from a controller (e.g., a computer processor in communication with a memory that stores computer readable instructions for execution by the computer processor). The position for the electrodes and/or timing of movement of the electrodes are based on the pattern that is being formed in the layer. For example, the motor may move the electrodes in and out relative to the centerline of the layer to the points where the laser begins and ends a line scan in sintering the desired pattern.

Figure 7:
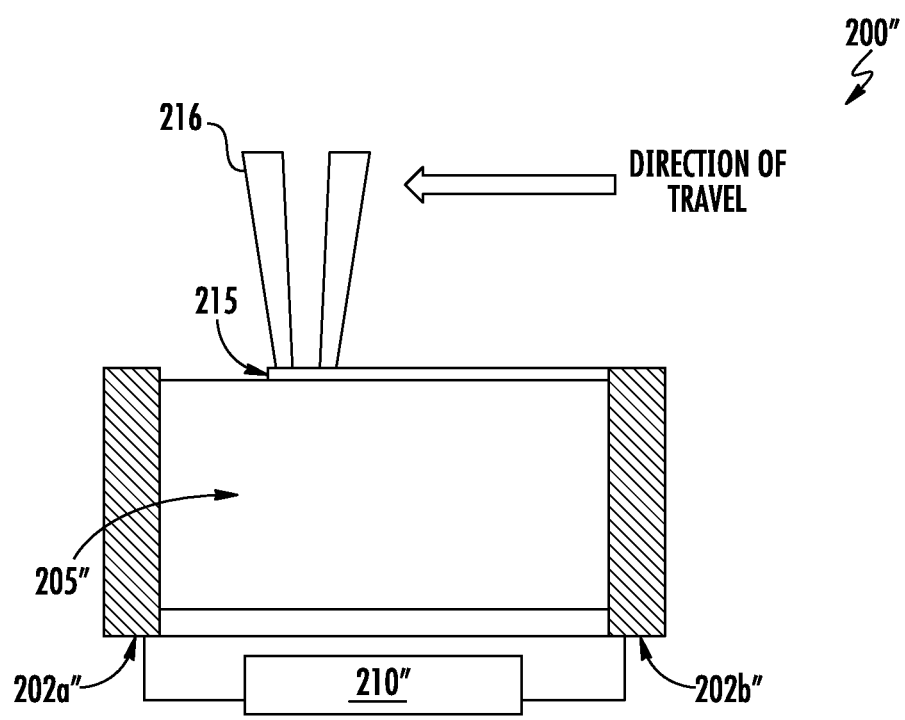
FIG. 7 illustrates a system for additive manufacturing according to one implementation.

In the system 200" shown in FIG. 7, the ceramic particles are mixed with one or more liquids to form a slurry, and the step of depositing the layer of ceramic particles includes depositing a layer 215 of slurry. In some implementations, the slurry includes ceramic particles mixed with one or more liquids and soluble polymeric solids (e.g., dispersants (such as Darvan C or Solsperse 4100), binders (such as polyacrylate or polyvinyl butyral), and/or plasticizers (such as polyethylene glycol). The slurry may be tape cast onto the build platform 204" or build material 205". The tape casting may include depositing the slurry with a doctor blade 216 or a slot die, for example. The slurry allows for good control over the thickness and uniformity of each layer 215, avoids unwanted ablation, and provides a higher particle packing density (e.g., 50%-70%) than using dry ceramic powder, which can result in a higher quality and consistent final product. The slurry also allows for the application of different materials in the same build.

The liquid portion of the slurry is allowed to evaporate or partially evaporate prior to applying the electric field and applying the localized energy to the particles to be sintered. In some implementations, the slurry may include a non-aqueous liquid (e.g., a solvent, such as propanol or methyl ethyl ketone) to reduce the evaporation time. Localized energy can be applied to accelerate at least partial removal of non-ceramic slurry components, such as solvents, binders, and plasticizers, prior to application of the electric field and at least partial sintering of ceramic particles. For example, the removal of non-ceramic slurry components includes evaporation and/or pyrolysis of the non-ceramic slurry components. As noted above, the localized energy may be provided by a laser or an electron beam or a projected energy source that selectively projects energy onto the particles to be sintered in a two-dimensional shape corresponding to the layer of the workpiece to be sintered (e.g., projector or lamp/mask).

In one experiment, two materials were tested: 8 mol % yttria stabilized zirconia and alumina. Both were in the form of pressed powder with no added binder. A colloidal carbon solution in ethyl alcohol was deposited into two parallel strips onto the surfaces of a portion of the powder adjacent the powder to be sintered to form the electrodes, and wires were attached to each strip and to the voltage supply. The strips were spaced apart 0.5 cm. The samples had 315V DC applied across the 0.5 cm gap. A portion of the ceramic particles between the parallel strips were sintered by a laser.

The effect of different types of scan patterns by the laser on the current flow and the microstructure was also tested. The laser scan patterns either bridged both electrodes (bridge scan), touched one electrode only (peninsula scan), or did not touch either electrode (island scan).

With an electric field applied across the electrodes and powder with colloidal carbon solution, current instantly rose while the laser scanned a pattern that connected the two electrodes (bridge scan). In one case, current continued to flow after the laser was removed. Current spikes during laser scanning were recorded for the bridge scan samples, but current rise during laser scanning was very small or non-measurable for the peninsula and island scans.

SEM analysis showed that grain growth and sintering at higher laser powers was enhanced with application of the electric field. The electric field resulted in larger average grain size in the samples with electric field versus without electric field.

The electric field can enable sintering to occur much more rapidly than occurs in conventional furnace sintering. Combining flash sintering processes with additive manufacturing patterned energy processes, such as selective laser sintering, can enable the direct sintering of ceramics and/or liquid phase sintering of ceramics and composites, including those with complex geometries. They also may enable improved quality and/or manufacturing speed of indirect additive manufacturing processes for ceramics and other materials.

Additive manufacturing by selective laser sintering or selective laser melting of ceramics is also limited by cracking due to thermal and shrinkage stresses in the manufacturing process. This may be ameliorated by partial sintering (neck formation without significant grain growth) during the laser sintering process to increase the strain tolerance of the material and reduce cracking. A partially sintered part is not fully dense, and has porosity remaining. Applications such as biomedical cell and tissue scaffolding, heat exchangers, filters, and some sensors benefit from such porosity. Applications requiring complete density may require densification in a furnace after laser sintering, but they do not require binder burn out prior to sintering.

Figure 6B:
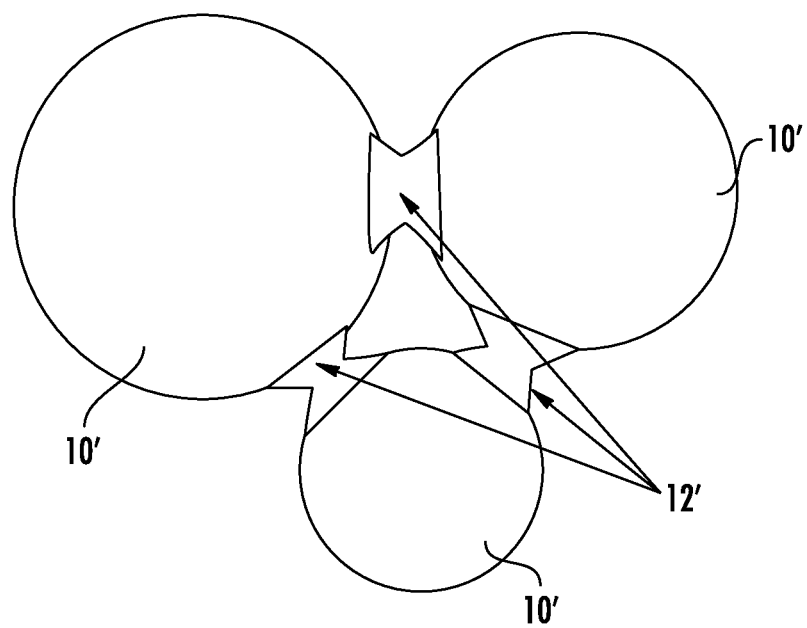
FIG. 6B illustrates necking from liquid phase sintering between ceramic particles during the additive manufacturing process, according to one implementation.

In other implementations, liquid phase sintering may be used with the ceramic particles. FIG. 6B illustrates particles 10' joined by liquid phase sintering. The necks 12', or connected areas between the particles 10', become liquid during application of energy in the additive manufacturing process. The necks 12' solidify when cooled and fasten the particles 10' together. Liquids allow very rapid diffusion and further increase sintering rates. For example, silicon carbide with boron or carbon additives may be used for liquid phase sintering. Other examples include alumina with calcium oxide or silica. In addition, in some implementations, the liquid phase sintering may be combined with subsequent recrystallization in furnace post-processing to modify material properties of the workpiece.

Various modifications of the devices and methods in addition to those shown and described herein are intended to fall within the scope of the appended claims. Further, while only certain representative devices and method steps disclosed herein are specifically described, other combinations of the devices and method steps are intended to fall within the scope of the appended claims, even if not specifically recited. Thus, a combination of steps, elements, components, or constituents may be explicitly mentioned herein. However, other combinations of steps, elements, components, and constituents are included, even though not explicitly stated. The term "comprising" and variations thereof as used herein is used synonymously with the term "including" and variations thereof and are open, non-limiting terms.

The invention claimed is:

1. A method of producing a workpiece using additive manufacturing, the method comprising:
    providing a first electrode and a second electrode, the electrodes being spaced apart and opposite each other;
    depositing a layer of ceramic particles;
    applying a voltage across the electrodes, the voltage causing the electrodes to create an electric field between them, where at least a first portion and a second portion of the layer of ceramic particles are disposed within the electric field;
    applying localized energy to the first portion of the layer of ceramic particles using an energy source, the first portion of the layer of ceramic particles being at least partially sintered to form part of the workpiece;
    repeating the deposition of ceramic particles and application of the electric field and the localized energy until the workpiece is formed; and
    removing the formed workpiece from the second portions of the layers of ceramic particles,
    wherein applying the localized energy occurs while the electric field is applied.

2. The method of claim 1, wherein adjacent ceramic particles neck together in response to application of the electric field and the localized energy, causing initial stage sintering.

3. The method of claim 1, further comprising heating the formed workpiece.

4. The method of claim 3, wherein heating the workpiece comprises heating the workpiece in a furnace, and the formed workpiece is partially densified prior to heating in the furnace and is fully densified after heating in the furnace.

5. The method of claim 1, further comprising depositing an electrically conductive material between the first portion of the layer of ceramic particles to be sintered and the first electrode, wherein the electrically conductive material is electrically coupled to the first electrode.

6. The method of claim 5, wherein the electrically conductive material comprises a ceramic powder doped with aliovalent substitution.

7. The method of claim 1, further comprising depositing an electrically conductive material to at least a portion of the first portion of the layer of ceramic particles to which the localized energy is applied for forming the workpiece.

8. The method of claim 1, wherein the energy source comprises a laser beam.

9. The method of claim 1, wherein the energy source comprises a lamp and a mask, the mask defining the shape of a perimeter of the first portion of the layer of ceramic particles, the mask being disposed between the lamp and the layer of ceramic particles.

10. The method of claim 9, wherein the mask is a virtual mask, and the virtual mask is provided by a digital light patterning (DLP) projector.

11. The method of claim 1, wherein depositing the layer of ceramic particles comprises depositing a slurry comprising the ceramic particles.

12. The method of claim 11, further comprising at least partially removing non-ceramic slurry components prior to applying the electric field and localized energy.

13. The method of claim 1, wherein providing the first and second electrodes comprises providing first and second pre-fabricated conductive plates.

14. The method of claim 1, wherein providing the first and second electrodes comprises depositing a first set of electrically conductive material adjacent the build material and a second set of electrically conductive material adjacent the build material.

15. The method of claim 1, further comprising heating the workpiece and the second portions of the layers of ceramic particles in a furnace prior to removing the formed workpiece from the second portions of the layers of ceramic particles.

16. The method of claim 1, further comprising moving the electrodes up or down relative to the build platform and/or inward or outward relative to a centerline of the layer of ceramic particles disposed within the electric field.

17. A system for producing a workpiece using additive manufacturing, the system comprising:
    a build platform;
    a ceramic particle distributor for distributing ceramic particles in a layer on the build platform;
    a first electrode and a second electrode disposed adjacent the build platform, the first and second electrodes being spaced apart and opposite each other and are electrically coupled to a voltage source for applying a voltage across the electrodes, wherein the electrodes create an electric field between and adjacent to the electrodes in response to receiving the voltage; and
    an energy source disposed adjacent to the first and second electrodes to deliver localized thermal energy to the ceramic particles to be sintered into a workpiece,
    wherein:
        the ceramic particle distributor deposits a layer of ceramic particles within the electric field over the build platform, and localized heat is delivered by the energy source to a first portion of the layer of ceramic particles disposed within the electric field simultaneously with the application of the electric field by the electrodes, the first portion of the layer of ceramic particles being at least partially sintered into the workpiece.

18. The system of claim 17, further comprising a furnace, wherein the at least partially sintered workpiece is heated in the furnace after being removed from the second portions of the layers of ceramic particles.

19. The system of claim 17, further comprising an electrically conductive material dispenser, the electrically conductive material dispenser distributing electrically conductive material onto the layer of ceramic particles between the first portion of the layer of ceramic particles to be sintered and the first electrode and/or second electrode.

20. The system of claim 17, wherein the energy source comprises a laser beam.

21. The system of claim 17, wherein the energy source comprises a lamp and a mask, the mask defining the shape of a perimeter of the first portion of the layer of ceramic particles, the mask being disposed between the lamp and the layer of ceramic particles.

22. The system of claim 21, wherein the mask is a virtual mask, and the virtual mask is provided by a digital light patterning (DLP) projector.

\* \* \* \* \*